(12) United States Patent
Borland

(10) Patent No.: US 6,816,723 B1
(45) Date of Patent: Nov. 9, 2004

(54) TELEPHONY DEVICE WITH INTEGRATED MESSAGING

(75) Inventor: David James Borland, Austin, TX (US)

(73) Assignee: Legerity, Inc., Austin, TX (US)

( * ) Notice: Subject to any disclaimer, the term of this patent is extended or adjusted under 35 U.S.C. 154(b) by 1009 days.

(21) Appl. No.: 08/874,005

(22) Filed: Jun. 12, 1997

(51) Int. Cl.[7] .............................................. H04H 1/00
(52) U.S. Cl. ...................... 455/412.1; 455/70; 455/73; 379/67.1
(58) Field of Search .............................. 455/412, 38.1, 455/70, 54.1, 72, 73, 78; 370/346; 375/242, 240, 241, 244; 379/67

(56) References Cited

U.S. PATENT DOCUMENTS

| | | | | |
|---|---|---|---|---|
| 5,327,481 A | * | 7/1994 | Horimoto | 379/58 |
| 5,467,372 A | * | 11/1995 | Nishitani | 375/244 |
| 5,630,205 A | * | 5/1997 | Ekelund | 455/54.1 |
| 5,638,369 A | * | 6/1997 | Ayerst et al. | 370/346 |
| 5,649,305 A | * | 7/1997 | Yoshida | 455/70 |
| 5,697,060 A | * | 12/1997 | Akahane | 455/38.1 |
| 5,778,314 A | * | 7/1998 | Sudo et al. | 455/412 |
| 5,790,957 A | * | 8/1998 | Heidari | 445/553 |
| 5,839,110 A | * | 11/1998 | Maeda et al. | 704/275 |
| 5,892,457 A | * | 4/1999 | Kim | 340/825.48 |
| 5,893,032 A | * | 4/1999 | Maeda et al. | 455/412 |
| 5,960,357 A | * | 9/1999 | Kim | 455/462 |
| 5,978,757 A | * | 11/1999 | Newton | 704/217 |
| 5,991,385 A | * | 11/1999 | Dunn et al. | 379/202 |
| 5,999,823 A | * | 12/1999 | Yoneyama et al. | 455/552 |
| 6,085,109 A | * | 7/2000 | Koga | 455/552 |

FOREIGN PATENT DOCUMENTS

| | | |
|---|---|---|
| GB | 2 254 524 A | 10/1992 |
| WO | WO 95/34984 | 12/1995 |

OTHER PUBLICATIONS

Am79C410A CT2 PhoX™ Controller for Digital Cordless Telephones, Technical Manual, Advanced Micro Devices, pp. 1–1 to 7–3(Rev. 3, 1995).

Am79C412 CT2 PhoX™ Controller for Digital Cordless Telephones, Technical Manual, Advanced Micro Devices, pp. 1–1 to 7–3 (© 1995 Advanced Micro Devices, Inc.).

Am79C432 ISM PhoX™ Controller for Digital Cordless Telephones, Technical Manual, AMD, pp. 1–1 to 7–3 (© 1996 Advanced Micro Devices, Inc.).

Am79C61X TADTalk™ Device for Digital Telephone Answering Systems, Technical Manual, AMD, pp. 1–1 to 6–3 (Preliminary Draft—10/97).

7.2 Coding of analogue signals by methods other than PCM, 32 kbit/s Adaptive Differential Pulse Code Modulation (ADPCM), Fascicle III. 4 Rec. G.721, pp. 231–268 (Melbourne, 1988).

* cited by examiner

Primary Examiner—Congvan Tran
(74) Attorney, Agent, or Firm—Williams, Morgan & Amerson, P.C.

(57) ABSTRACT

A cordless communication device is provided in which a processor used to code and decode signals for the wireless communication is further used to process messages for an integral answering machine. An existing digital signal processor (DSP) within the cordless phone is used to code and decode signal for wireless communication between the base station and the handset. The coding scheme used for the wireless communication, for example, adaptive differential pulse code modulation (ADPCM), is also used for compressing, storing and retrieving messages used in the answering machine.

20 Claims, 5 Drawing Sheets

TELEPHONY DEVICE WITH INTEGRATED MESSAGING

BACKGROUND

The present invention is directed generally to telephony devices, and more particular, to telephony devices having integrated messaging capabilities.

As the telecommunications industry has grown, the number and different types of telephony devices has also dramatically increased. The use of telephony devices in mobile and cordless environments has also increased accordingly. There has also been an increased need and interest in providing reliable and easy to use peripheral devices such as answering machines, caller ID boxes, and the like.

Digital answering machines have gained wide spread use by the telecommunications consumers. A typical digital answering machine is formed as a stand alone device which is coupled between a telephone and the subscriber line of the telephone in order to intercept and answer an incoming call under predefined conditions. The answering machine also provides the capability of storing messages from the calling party for later retrieval.

Various approaches have been taken to integrate the functionality of an answering machine within a telephone. For example, the basic components of the digital answering machine have been incorporated into a telephone. Such systems typically include a digital voice memory for storing messages, including broadcast messages and received messages, and a digital signal processor (DSP) dedicated to answering machine functions such as compression of the messages, storage and retrieval. Another approach for integrating answering machine functions within an existing telephone is to provide an answering service remote from the telephone. This type of service routes unanswered calls to the remote answering service where messages are stored for access over the subscriber line.

As the telecommunications industry continues to grow, there remains an interest in providing increased accessibility to the various telephony functions including answering functions. It is also desirable, however, to reduce the overall costs of the various telephony devices. Thus, there is generally a tension between a desire to provide added functionality while meeting the demands of lower costs.

SUMMARY OF THE INVENTION

Generally, the present invention relates to communication devices having integrated messaging capabilities. In one particular embodiment, a communication device is provided which operates in a communication mode and a message mode. The communication device includes a speaker, a receiver provided to receive signals of a call received from a calling party and a memory arrangement for storing messages. A processor is coupled to the memory arrangement and is configured to code and decode signals in accordance with a cordless communication compression scheme used for cordless communication when in the communication mode. The processor is further configured to code signals received from the calling party, using the wireless communication compression scheme, for storage in the memory arrangement as a message when in the message mode.

In accordance with another embodiment of the invention, a cordless telephone system having message recording capabilities is provided. The cordless phone includes a base station coupled to a switched telephone network. The base station includes a base station processing unit configured to receive signals from the switched telephone network and to code and decode the signals in accordance with a wireless transmission compression scheme. The base station further includes a transmitter/receiver coupled to the processing unit to transmit/receive coded signals. The cordless phone further includes a handset having a transmitter/receiver configured to transmit/receive coded signals for wireless communication with the base station, and a handset processing unit, coupled to the transmitter/receiver, configured to code and decode signals transmitted to and received from the base station. A memory arrangement is provided within the base station or the handset and is coupled respectively to either the base station processing unit or the handset processing unit. The memory arrangement is used to store messages which are coded by the respective one of the base station processing unit and the handset processing unit using the wireless transmission compression scheme.

One embodiment of the invention provides messaging functions within a cordless phone system. In operation, the base station receives a call from a calling party. The cordless phone retrieves a broadcast message from a memory arrangement of the cordless phone in response to initiation of a message mode. The broadcast message is transmitted from the base station to the calling party. A message from the calling party is received at the base station and coded using a cordless transmission compression scheme used for cordless communication between the base station and the handset. The coded message from the calling party is stored in the memory arrangement of the cordless phone.

In one particular embodiment, data transmitted between the base station and the handset are coded using adaptive differential pulse code modulation (ADPCM). In a further embodiment, the messages stored in the memory arrangement are also coded using ADPCM.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
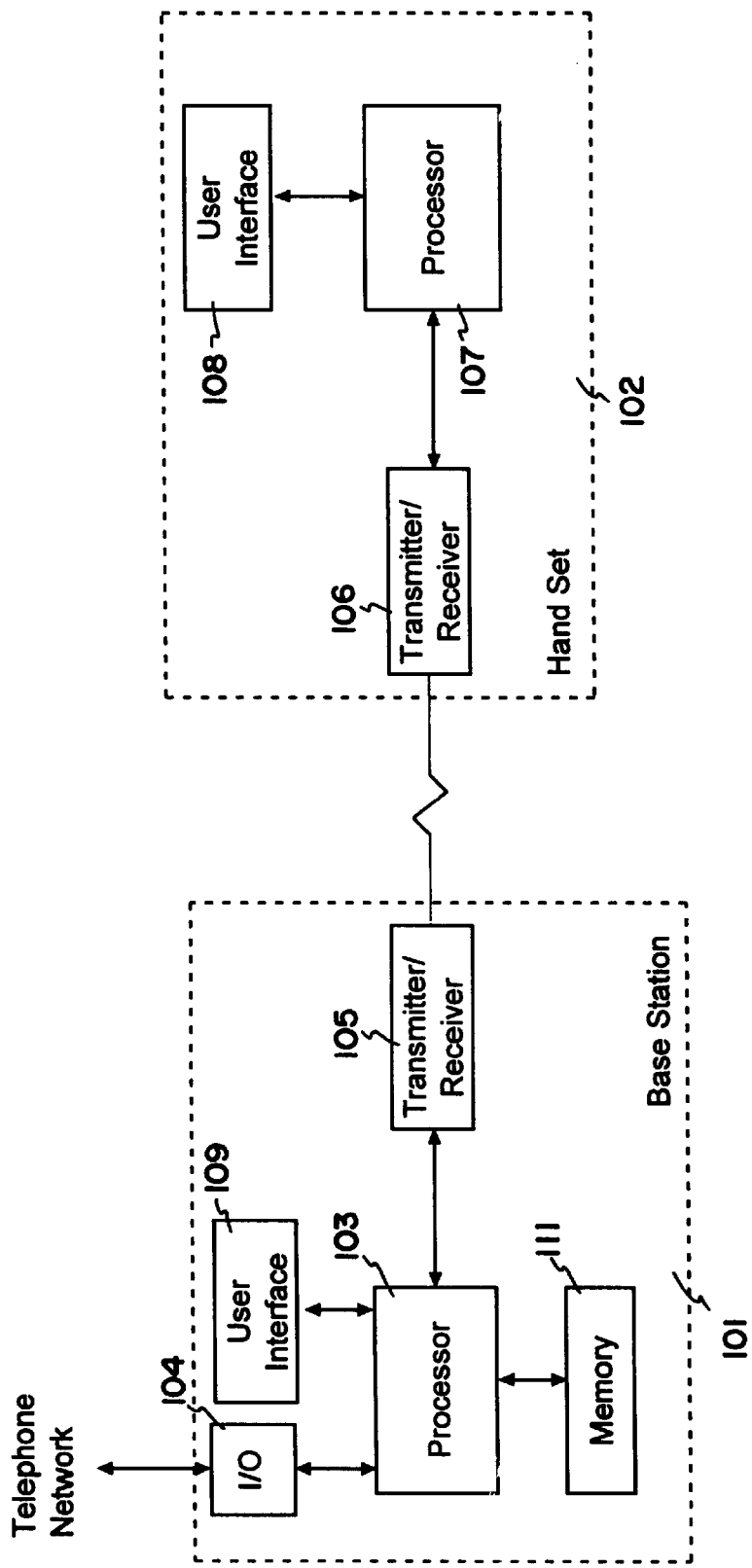
FIGS. 1A and 1B illustrates telephony devices in accordance with various embodiments of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a number of different telephony devices where advantages can be obtained from integrating messaging capabilities into the device. As used herein, messaging capabilities refers generally to storage and/or retrieval of messages from a calling party as well as other typical answering machine functions. The invention is particularly suited for use in connection with a cordless phone. While the present invention is not so limited, an appreciation of various aspects of the invention is best gained through the discussion of various application examples provided below.

FIG. 1A illustrates a base station 101 and a handset 102 of a cordless telephone system having answering machine/messaging functions formed integral with the base station 101. It should be appreciated that the illustration depicted in FIG. 1A is primarily conceptual and that the various blocks may designate one or more components used to accomplish the various functions described in connection therewith whether implement in hardware and/or software. The base station 101 includes a processor 103 used to process information transmitted to the handset and to process signals received from the handset. An I/O port 104 of the base station 101 is coupled to a telephone network such as a public standard switch network (PSTN).

A transmitter/receiver 105 is provided to communicated wirelessly with a transmitter/receiver 106 of the handset 102. Current cordless phones typically operate in the frequency band of 900 MHz. As is well known in the industry, the base station 101 and handset 102 are provided with a number of safeguards against false rings and unauthorized calls. The handset 102 further includes a processor 107 which processes signals received from the base station for broadcast on a speaker (not shown) of the handset and to code signals received at a microphone (not shown) of the handset for transmission to the base station. In one particular embodiment, the signals transmitted between the base station 101 and the handset 102 are coded/decoded using adaptive differential pulse code modulation (ADPCM). For example, DSPs within the processors 103 and 107 of the base station 101 and handset 102 can be used to process the various compression algorithms.

The handset 102 also includes a user interface 108 such as a standard telephone keypad. A user interface 109 of the base station 101 is provided to access and control functionality of the answering machine/messaging functions provided within the base station 101. In another embodiment, the standard keypad on the handset 102 may be used instead of or in addition to the interface 109 in the base station to access the answering machine/messaging functionality.

The base station 101 further includes a memory arrangement 111 which is used to store messages. The memory arrangement may be a single memory, or multiple memories. The memory arrangement may further be integrated into part of the memory used for operation of the processor or may be separated therefrom. The messages stored in the memory arrangement 111 correspond to the answering machine/messaging functions. In particular, a number of messages may be stored which are broadcast to a calling party when the answering function is initiated. In response to these messages, the calling party may desire to leave a message for the party being called. In this case, the messages from the calling party are stored in the memory arrangement 111 for later retrieval. In accordance with one aspect of the invention, as described more fully below, the same coding scheme used for the wireless transmission between the base station 101 and handset 102 is used to code messages stored within the memory arrangement 111. For example, the messages may be coded using ADPCM coding.

Figure 1B:
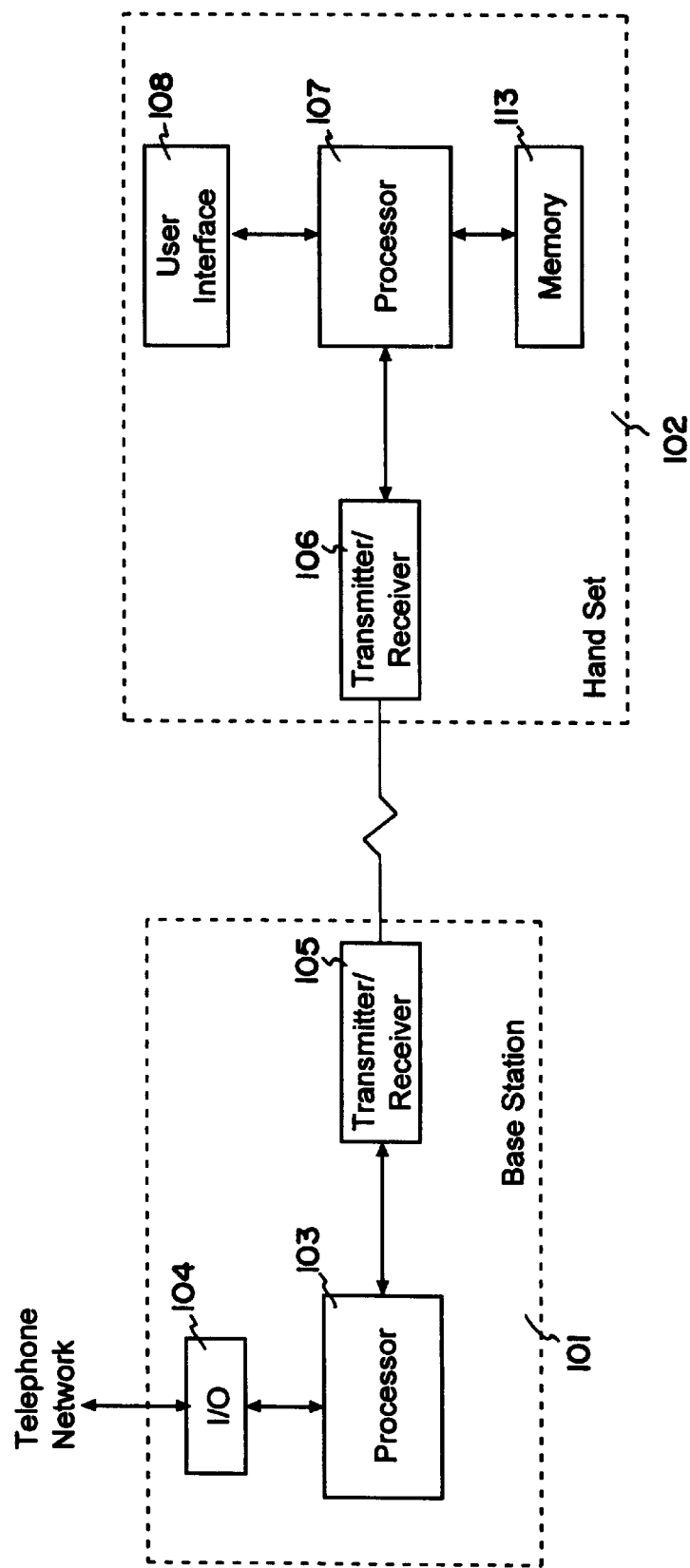

FIG. 1B illustrates another embodiment of the invention in which the answering machine/messaging functions are incorporated into the handset 102. In this embodiment, a memory arrangement 113 is provided within the handset 102 and is used to store messages. It will be appreciated that the processor 107 within the handset 102 has the capability to perform the necessary coding used for the messages such as the ADPCM coding, for example.

Figure 2:
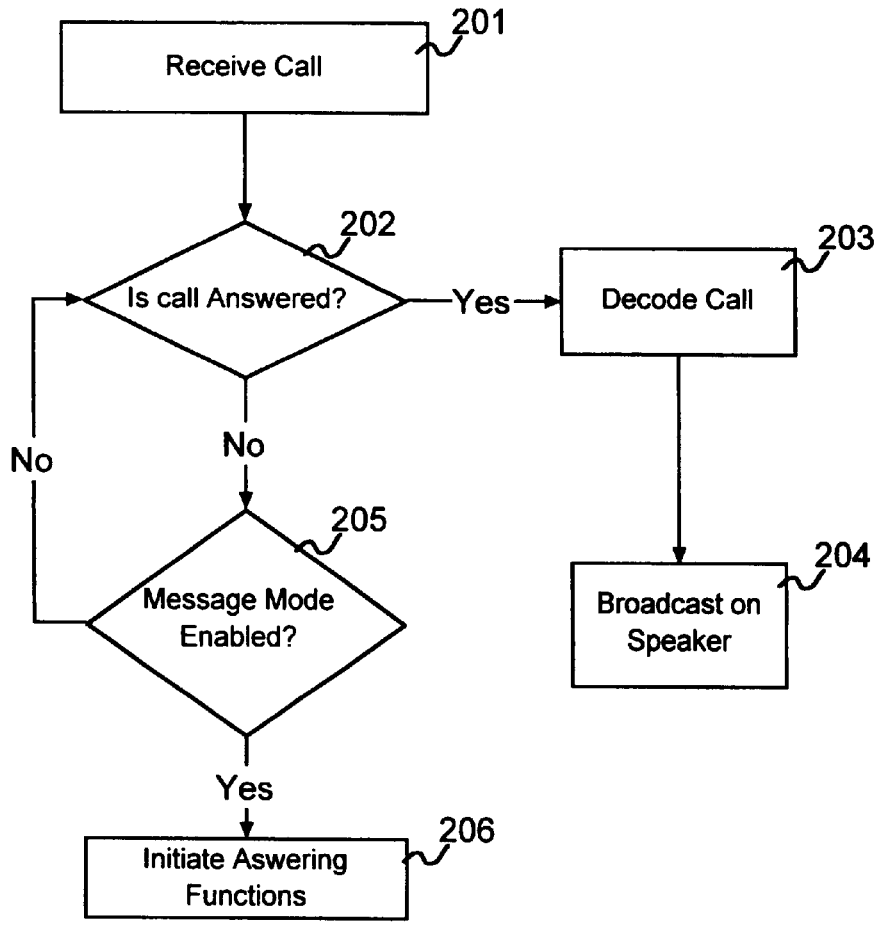
FIG. 2 is a flowchart illustrating the operation of a device in accordance with one embodiment of the invention.

The general operation of an incoming call in accordance with one particular embodiment is illustrated in FIG. 2. In FIG. 2, the cordless phone receives an indication of an incoming call at block 201. The processor determines whether the call has been answered at block 202. If the call is answered, a DSP or other suitable processor provided within the handset is used to decode coded signals received from the base station at block 203. The decoded signals are provided to a speaker of the handset at step 204 for broadcast to a user. It will be appreciated that the coded signals may be in a compressed ADPCM format used for the wireless communication between the base station and the handset.

When the call is not answered at block 202, the system proceeds to block 205 to determine whether a message mode has been enabled. The message mode may be enabled, for example, when a certain number of rings have occurred without being answered. The message mode may be enabled in some other manner such as manual input from the user, for example. If the message mode is not enabled, the system returns to block 202 to determine whether the call has been answered. This process continues as long as the call is not answered and remains active and until a message mode is enabled. If it is determined that the message mode is enabled at block 205, the answering functions are initiated at block 206. The answering functions include, for example, broadcasting of messages to the calling party and storage of messages from the calling party in the memory.

It will be appreciated, that the same processor, (e.g., an integrated DSP) used to process the coded signal for wireless transmission between the base station and the handset of the cordless phone may be used to perform the answering machine/messaging functions. This dual functionality reduces the overall costs associated with providing answering machine/messaging functions. Moreover, the high quality ADPCM coding used for the wireless communication link between the handset and the base station can also be used to perform high quality compression of messages in the message memory. In this manner, a very high quality recording system can be implemented without adding significant hardware overhead. When the ADPCM coding is used to compress the received messages, much of the code needed to perform the answering machine/messaging functions is already available reducing the amount of processor memory needed to accomplish the dual functionality.

When typical ADPCM coding is used to compress the messages, little or no degradation in sound quality is achieved. The ADPCM format also permits a higher compression scheme to be used. For example, both a 32 kbit/sec and a 24 kbit/sec compression technique are provided within the ADPCM standard. The messages stored in the message memory may be compressed using the 32 kbit/sec ADPCM coding and/or the 24 kbit/sec ADPCM coding. In accordance with one embodiment of the invention, different compression techniques can be used for the message functions and the wireless communication. For example, using the same DSP engine, 32 kbit/sec coding could be used for the cordless link between the base station and the handset and 24 kbit/sec ADPCM coding could be used for the answering machine/messaging functions.

When using the 24 kbit/sec ADPCM coding technique, some degradation in voice quality is noticed. However, a high quality voice is still obtained. Additionally, more message capacity is obtained using the higher compression coding. This may be used to further reduce overall system costs by reducing memory costs. In one particular embodiment, the user may select between the different coding rates as desired to either increase the quality or the storage capacity. The system may also be programmed to automatically select a coding technique based on the amount of free message memory available and could be programmed to automatically recode stored messages as available memory is reduced.

It should be appreciated that in the above embodiments where the same coding techniques are used for storing messages as are used for the wireless communication between the base station and the handset overall reduction in processing may be obtained. For example, where the messages are stored in the handset, the messages may be stored directly in the memory without first decoding the message as it is received from the base station. Where ADPCM is used for the wireless communication, once a message mode is initiated the message information can be stored in the memory in the ADPCM coded format as it is received from the base station.

In one embodiment of the invention, messages stored in a message memory in the base station can be accessed from the handset. In this embodiment, because the messages are already coded the message can be transferred to the handset without coding. Using the same coding technique for messages and for the wireless link also facilitates the process of broadcasting messages to the calling party. The same processing used to decode data received from the handset during communication can be used to decode the messages and broadcast them to the calling party. In a cordless phone storing the messages in the handset, the broadcast message may be stored in a memory of the handset compressed using ADPCM, for example. When the answering function is initiated, the ADPCM coded broadcast message may be retrieved from the memory and transmitted to the base station without the need for coding. Using the standard ADPCM decoder provided within the base station, the broadcast message can be decoded and provided to the subscriber line.

Figure 3:
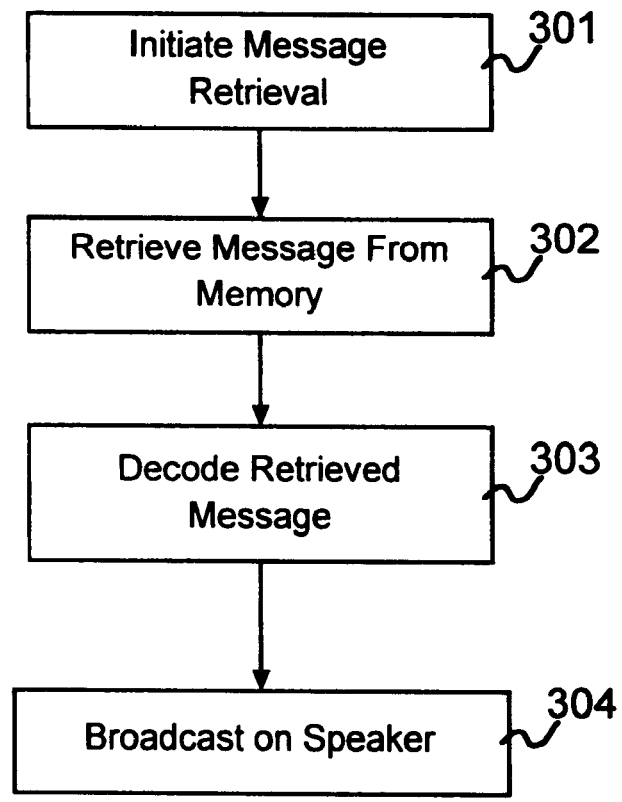
FIG. 3 is another flowchart illustrating the operation of another device in accordance with an embodiment of the invention.

FIG. 3 illustrates a process for retrieving a message in one embodiment of the invention. At block 301, the user initiates a message retrieval process. The system retrieves a designated message from memory at block 302 and decodes the message at block 303. The decoded message is broadcast on a speaker of the cordless phone at block 304. The speaker may be a speaker built into the base station, the handset speaker, or other appropriate speaker depending on the particular configuration of the cordless phone answering machine/messaging functions. When the high quality ADPCM compression rate is used, the reproduced message retains the same voice quality as when communicating in real-time.

Figure 4:
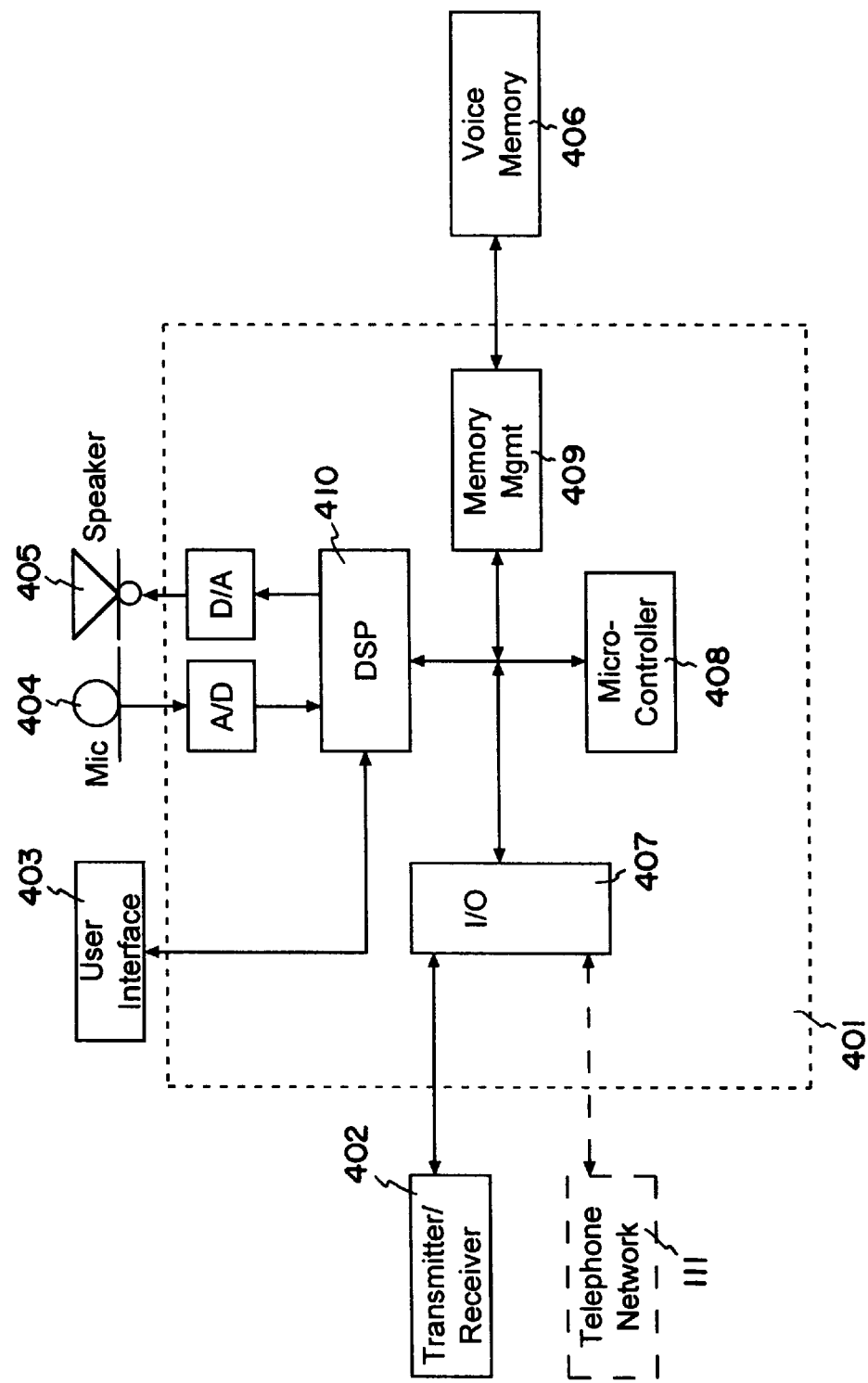
FIG. 4 illustrates still another embodiment of a telephony device in accordance with the invention.

FIG. 4 illustrates still another embodiment of the invention. In FIG. 4, the processing unit used to code/decode information transferred wirelessly between the base station and the handset is also used to code/decode messages. In the embodiment, the processing hardware accomplishing both functions are integrated on a single chip designated generally by block 401. While this particular embodiment will be described as being provided within the base station, it will be appreciated that the description could also be generally applicable to a handset.

A transmitter/receiver 402 is provided to communicate with the handset. A user interface 403 is provided to receive input from the user and to provide output to the user. A microphone 404 and a speaker 405 are also coupled to the chip 401. It will be appreciated that the microphone 404 and speaker 405 conceptually represents the functionality needed to record and broadcast messages. In certain embodiments, the microphone 404 and speaker 405 provided within the handset could be used.

A voice memory 406 is also provided to store messages for use in connection with the answering machine/messaging functions. An I/O port 407, connects the chip to the transmitter/receiver 402 and the telephone network 111. The I/O port may include a protocol handler, implemented in either hardware, firmware, or both. A microcontroller 408, a memory management unit 409 and a DSP 410 are also integrated into the chip 401. The memory management unit 409 provides an interface to the voice message memory 406. The microcontroller 408 and DSP 410 provide functions typically performed by such devices in a cordless phone base station. The DSP, for example, may be used to implement an ADPCM codec that codes and decodes data for wireless communication with the handset.

As noted above, the DSP 410 may also be used to code and decode messages for storage in the voice memory and for broadcast to the speaker. The microcontroller 408 and/or DSP 410 may further be configured to control the user interface to the answering machine/messaging functions provided within the cordless phone.

In the above described embodiments, the processor is described as being a programmed processor such as a DSP. It will be appreciated that in other embodiments dedicated hardware circuits may also be employed to accomplish some or all of the functionality described. For example, an ADPCM codec may be implemented in hardware and be operated under control of a processor. The hardware codec may also be used to code and/or decode messages for the answering machine/messaging functionality. It will be appreciated that cost reductions are obtained using the same hardware for multiple functions. As noted above, the present invention is applicable to a number of different telephony devices and systems where integral messaging capabilities are provided in the device. Accordingly, the present invention should not be considered limited to the particular examples described above, but rather should be understood to cover all aspects of the invention as fairly set out in the attached claims. Various modifications, equivalent processes as well as numerous devices to which the present invention will be applicable will be readily apparent to those of skill in the art upon review of the present specification. The claims are intended to cover such modifications and devices.

I claim:

1. A cordless communication device operative in a communication mode and a message mode, the communication device comprising:

a speaker;

a receiver provided to receive signals of a call received from a calling party;

a memory arrangement for storing messages; and a processor coupled to the memory arrangement, the processor being configured to code and decode signals in accordance with a digitized cordless communication compression scheme used for cordless communication when in the communication mode, and, when in the message mode, to code signals received from the calling party using the digitized cordless communication compression scheme and store the coded signals as a coded message in the memory arrangement.

2. A device as recited in claim 1, wherein the cordless communication device comprises a cordless phone.

3. A device as recited in claim 2, wherein the digitized cordless compression scheme comprises adaptive differential pulse code modulation (ADPCM).

4. A device as recited in claim 2, wherein the digitized cordless compression scheme comprises adaptive differential pulse code modulation (ADPCM) and wherein a first compression rate is used to code and decode signals for cordless communication and a second compression rate is used to code the messages.

5. A device as recited in claim 1, further comprising a user input for initiating a message retrieval request, the processor being further configured to retrieve the message stored in the memory arrangement and to decode the message for broadcast on the speaker in response to the initiation of the message retrieval request.

6. A device as recited in claim 1, wherein the memory arrangement stores a coded broadcast message for broadcast to the calling party when in the message mode.

7. A device as recited in claim 6, wherein the broadcast message is coded using adaptive differential pulse code modulation.

8. A cordless telephone system having message recording capabilities, the system comprising:
  (a) a base station coupled to a switched telephone network, the base station including:
    (1) a base station processing unit configured to receive signals from the switched telephone network and to code and decode the signals in accordance with a digitized wireless transmission compression scheme; and
    (2) a transmitter/receiver coupled to the processing unit to transmit/receive coded signals;
  (b) a handset including;
    (1) a transmitter/receiver configured to transmit/receive coded signals for wireless communication with the base station; and
    (2) a handset processing unit coupled to the transmitter/receiver, the processing unit being configured to code and decode signals transmitted to and received from the base station; and
  (c) a memory arrangement provided within one of the base station and the handset and coupled respectively to one of the base station processing unit and the handset processing unit, the memory arrangement being used to store messages as coded by the respective one of the base station processing unit and the handset processing unit using the same digitized wireless transmission compression scheme used to code the signals transmitted/received between the base station and the handset.

9. A cordless telephone system as recited in claim 8, wherein the digitized wireless transmission compression scheme comprises adaptive differential pulse code modulation (ADPCM).

10. A cordless telephone system as recited in claim 9, wherein the memory arrangement is provided within the base station, the base station processing unit including a digital signal processor configured to decode ADPCM coded signals.

11. A cordless telephone system as recited in claim 10, wherein the digital signal processor is further configured to store the message in the memory arrangement as an ADPCM coded message.

12. A cordless telephone system as recited in claim 8, wherein the memory arrangement is provided within the handset and the message are received from the base station as an adaptive differential pulse code modulation (ADPCM) coded signals, the handset processing unit storing the message in the memory arrangement as the ADPCM coded signal.

13. A cordless telephone system as recited in claim 8, wherein the memory arrangement further stores a broadcast message announced to a calling party when in the message mode.

14. A cordless telephone system as recited in claim 13, wherein the broadcast message is stored in the memory arrangement as an ADPCM coded signal.

15. A method providing messaging functions within a cordless phone system having a base station and a handset, the method comprising:
  receiving at the base station a call from a calling party, wherein the call is encoded using a predetermined digitized cordless transmission compression scheme;
  retrieving a broadcast message from a memory arrangement of the cordless phone in response to initiation of a message mode;
  transmitting the broadcast message from the base station to the calling party;
  receiving a message from the calling party at the base station;
  coding the message from the calling party using the predetermined digitized cordless transmission compression scheme used for cordless communication between the base station and the handset; and
  storing the message from the calling party in its coded form in the memory arrangement of the cordless phone.

16. A method as recited in claim 15, wherein the coding of the message from the calling party comprises coding the message using adaptive differential pulse code modulation (ADPCM).

17. A method as recited in claim 15, wherein the broadcast message stored in the memory arrangement of the cordless phone is coded using adaptive differential pulse code modulation (ADPCM).

18. A method as recited in claim 15, wherein the message is coded at the base station as an adaptive differential pulse code modulation (ADPCM) coded signal for storage in the memory arrangement of the cordless phone.

19. A method as recited in claim 15, wherein data transmitted between the base station and the handset are coded using adaptive differential pulse code modulation (ADPCM) and wherein messages stored in the memory arrangement are coded using ADPCM.

20. A method as recited in claim 19, wherein the data transmitted between the base station and the handset are coded using a higher number of bits per second than a number of bits per second used to code the messages.

* * * * *